J. W. WINGERT.
GRAIN CAR.
APPLICATION FILED JAN. 25, 1922.
1,434,517.
Patented Nov. 7, 1922.
3 SHEETS—SHEET 2.
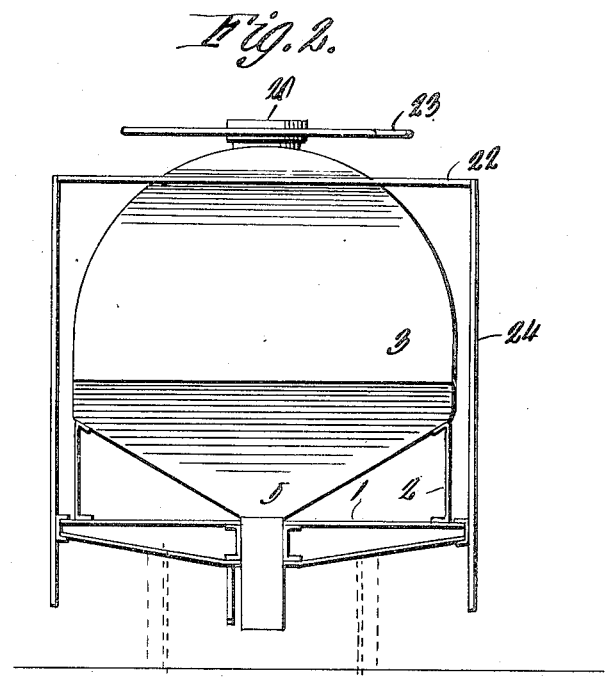
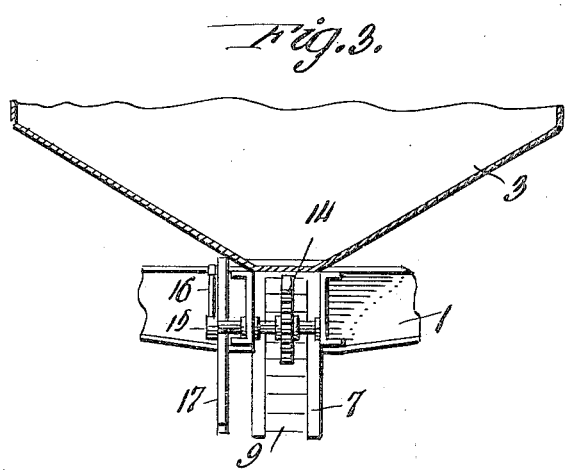
WITNESSES
Inventor
JOHN W. WINGERT
By Richard B. Owen

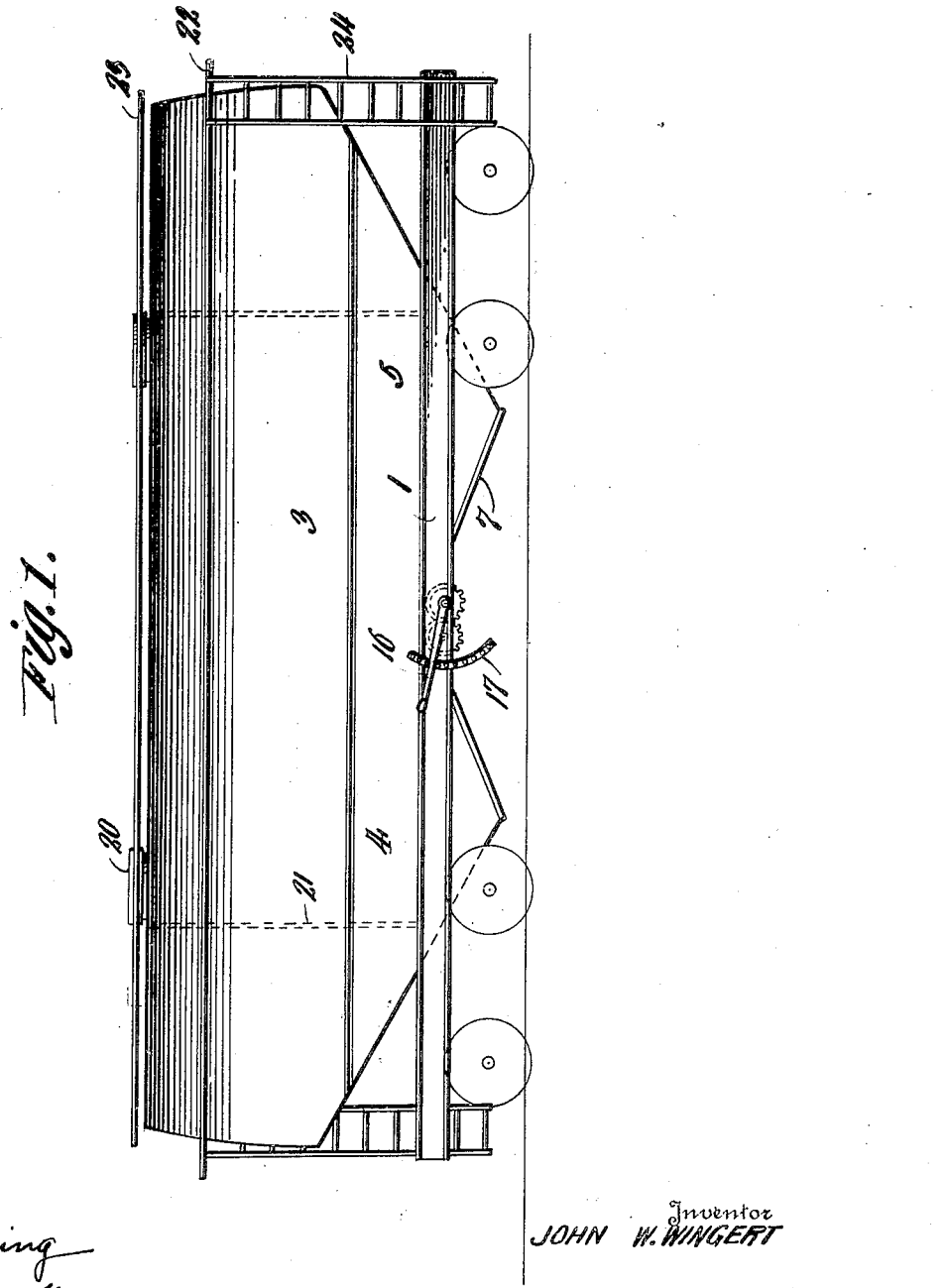

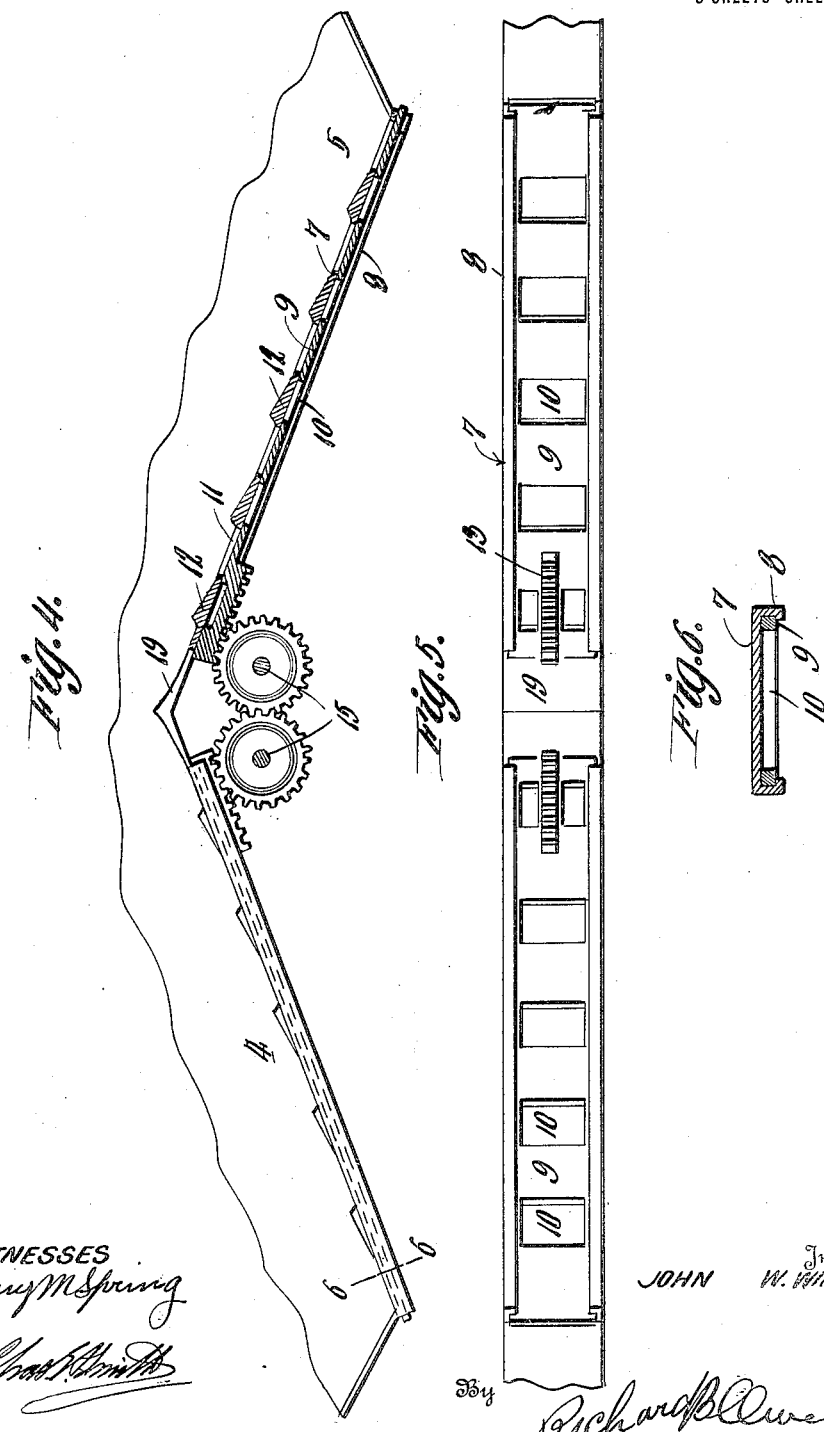

Patented Nov. 7, 1922.

1,434,517

UNITED STATES PATENT OFFICE.

JOHN W. WINGERT, OF WICHITA, KANSAS.

GRAIN CAR.

Application filed January 25, 1922. Serial No. 531,707.

*To all whom it may concern:*

Be it known that I, JOHN W. WINGERT, a citizen of the United States, residing at Wichita, in the county of Sedgwick and State of Kansas, have invented certain new and useful Improvements in Grain Cars, of which the following is a specification.

The present invention relates to grain cars and has for its principal object to provide simple and efficient means for unloading the grain from the car.

Another important object of the invention is to generally improve upon unloading mechanisms for grain cars by providing a device which will be extremely simple in construction, efficient in operation, capable of being manufactured at a comparatively low cost and reliable in operation.

With the above and numerous other objects in view as will appear as the description progresses, the invention relates to certain novel features of construction, and the combination and arrangement of parts as will be hereinafter fully described and claimed.

In the drawings:—

Figure 1 is a side elevation of the car embodying my invention,

Figure 2 is an end elevation thereof,

Figure 3 is a central fragmentary transverse section therethrough,

Figure 4 is a longitudinal section taken through the trough portions of the car, Figure 5 is a top plan of the structure shown in Figure 4, and Figure 6 is a section taken substantially on the line 6—6 of Figure 4.

Referring to the drawing in detail it will be seen that the car is provided with a base frame indicated generally at 1 which has extending therefrom the brackets 2. The body 3 of the car is supported centrally on the base frame 1 and at its sides on the brackets 2. The body 3 of the car is in the shape of a tank and its bottom is formed into a pair of adjacent hoppers 4 and 5 which are similar in construction and have their adjacent bottoms formed into troughs shown to advantage in Figure 5. The bottom of these troughs are provided with guides 7 which have the angular extension 8 that form raceways for the slides 9. The slides 9 are provided with the spaced openings 10 which are adapted to be placed in registry with spaced openings 11 provided in the guides 7. These guides 7 are molded so as to provide slanting raised portions 12 adjacent each opening and these raised portions slant toward the openings 11 as shown to advantage in Figure 4 so as to aid the grain in moving by gravitation to the openings 11 when the openings 10 are in registry therewith. The upper ends of the slides are provided on their lower sides with the racks 13 that mesh with the inter-meshing gears 14 carried by suitable shafts 15 upon one of which is carried an operating lever 16 which rotates adjacent a quadron 17 provided with a plurality of apertures so that an ordinary car ceiling device may be passed therethrough and the lever locked in a desired position so as to prevent unauthorized tampering therewith. When it is desired to unload the grain from the car all that is necessary is to rotate the lever 16 thus actuating the gears 14 which mesh with racks 13 thus the slides 9 are moved toward each other at their upper ends causing the openings 10 to come into registry with the openings 11. A suitable casting 19 is disposed between the upper ends of the guides 7 and is so constructed as to be removable when it is desired to remove the slides from the car for replacement or repair as may be found necessary from time to time and of couse during the assembly of the car itself.

The car is loaded through suitable manholes which are provided with covers 20 and the ladders 21 depend from the openings so that access may be had to the interior of the car for inspecting grain and cleansing purposes when so desired. As shown in the present embodiment a suitable platform 22 is provided adjacent the top of the body 3 and hand rail 23 situated close thereto and a ladder 24 is provided so that access may be had to the platform 22 when desired.

Although I have described my invention with some degree of particularity, it is to be understood that I do not wish to be limited to the precise embodiment of the invention herein shown and described other than as hereinafter claimed.

Having thus described my invention what I claim as new is:—

1. In a grain car of the class described including a bottom having a trough therein, a guide provided with a plurality of openings, said guide constructed so as to have raised portions adjacent each opening slanting there-towards, a slide associated with said guide and provided with a plurality of openings and means for moving said slide in the manner and for the purpose specified.

2. In combination, a guide provided with a plurality of openings, raised portions provided on said slide adjacent each opening and slanting there-towards, a slide provided with a plurality of openings, and means for moving said slide so as to place its openings in registry with the openings in said guide in the manner and for the purpose specified.

In testimony whereof I affix my signature in presence of two witnesses.

JOHN W. WINGERT.

Witnesses:
F. A. RAUBER,
J. H. NEARHOOD.